United States Patent
Yim et al.

(10) Patent No.: US 8,145,257 B2
(45) Date of Patent: Mar. 27, 2012

(54) APPARATUS AND METHOD FOR PROVIDING MOBILE INSTANT MESSAGING SERVICE

(75) Inventors: Hye-Won Yim, Seoul (KR); Hyung-Sun Kim, Gyeonggi-do (KR); Thai-Shik Yang, Gyeonggi-do (KR)

(73) Assignee: KTFreetel Co., Ltd., Seoul (KR)

( * ) Notice: Subject to any disclaimer, the term of this patent is extended or adjusted under 35 U.S.C. 154(b) by 485 days.

(21) Appl. No.: 12/306,576

(22) PCT Filed: Jun. 29, 2007

(86) PCT No.: PCT/KR2007/003186
§ 371 (c)(1),
(2), (4) Date: Dec. 24, 2008

(87) PCT Pub. No.: WO2008/002105
PCT Pub. Date: Jan. 3, 2008

(65) Prior Publication Data
US 2009/0186638 A1  Jul. 23, 2009

(30) Foreign Application Priority Data

Jun. 30, 2006  (KR) .................. 10-2006-0061198

(51) Int. Cl.
*H04M 1/00* (2006.01)
(52) U.S. Cl. .................. 455/550.1; 455/466; 455/414.1; 709/206

(58) Field of Classification Search .............. 455/466, 455/414.1, 550.1; 709/206; 715/752
See application file for complete search history.

(56) References Cited

U.S. PATENT DOCUMENTS

| 7,590,696 B1* | 9/2009 | Odell et al. ................. 709/206 |
| 2004/0078424 A1* | 4/2004 | Yairi et al. ................. 709/203 |
| 2005/0044152 A1* | 2/2005 | Hardy et al. ................ 709/206 |
| 2005/0114533 A1 | 5/2005 | Hullfish et al. |
| 2005/0210394 A1* | 9/2005 | Crandall et al. ............. 715/752 |

FOREIGN PATENT DOCUMENTS

| KR | 10-2001-0035050 A | 5/2001 |
| KR | 10-2002-0027433 A | 4/2002 |
| KR | 10-2004-0044720 A | 5/2004 |
| KR | 10-2005-0001222 A | 1/2005 |
| WO | WO 01/41477 A1 | 6/2001 |

* cited by examiner

*Primary Examiner* — Danh Le
(74) *Attorney, Agent, or Firm* — Jones Day

(57) ABSTRACT

The present invention relates to apparatus and method for providing a mobile instant messaging service. The apparatus includes a buddy status managing unit for recording and managing a status information of at least one mobile messenger subscriber; a buddy list managing unit cooperating with the buddy status managing unit for managing a buddy list of the mobile messenger subscriber based on a telephone number, and providing the buddy list to the mobile messenger subscriber; and a chatting service unit for providing a chatting service between the mobile messenger subscriber and a buddy selected by the mobile messenger subscriber in the buddy list provided to the mobile messenger subscriber by the buddy list managing unit.

5 Claims, 4 Drawing Sheets

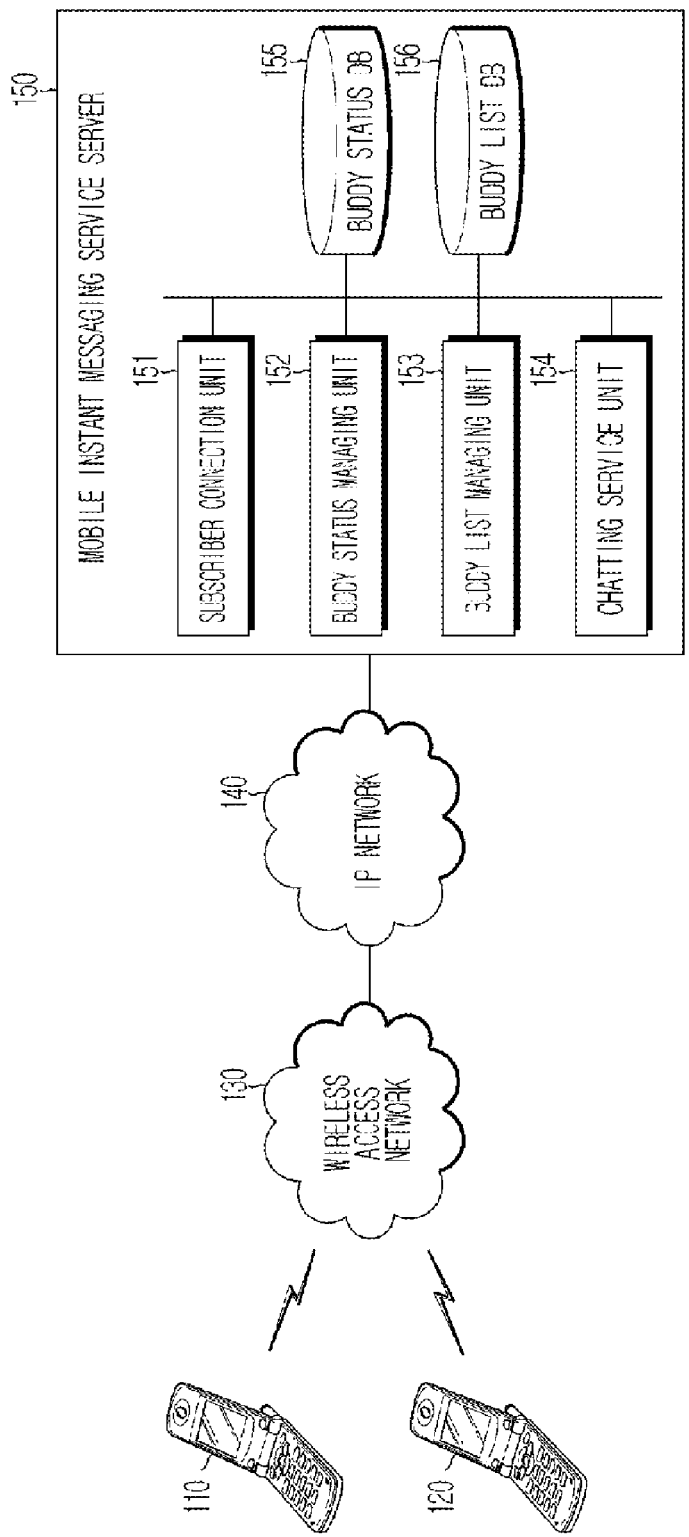
[Fig. 1]

[Fig. 2]
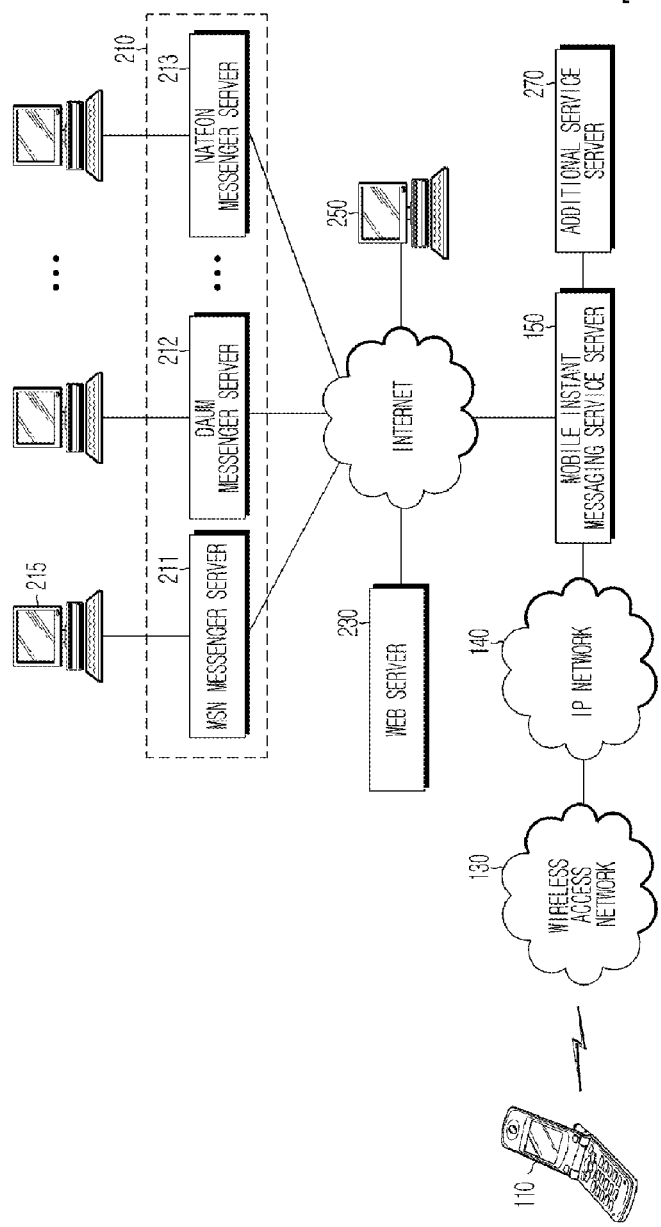
[Fig. 3]
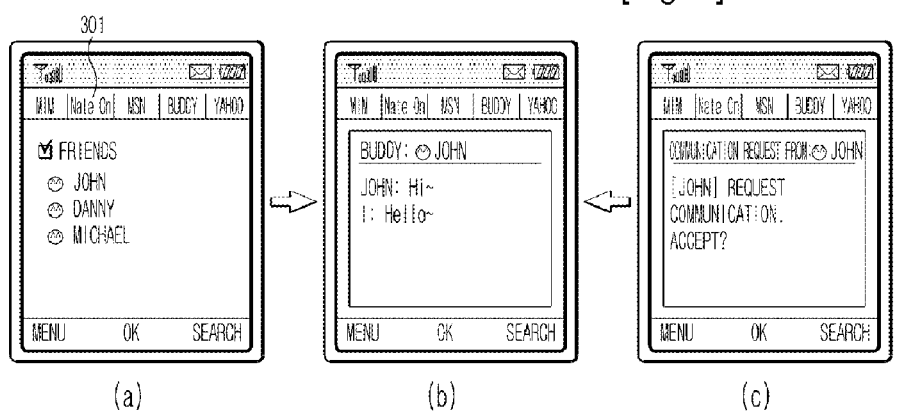

[Fig. 4]
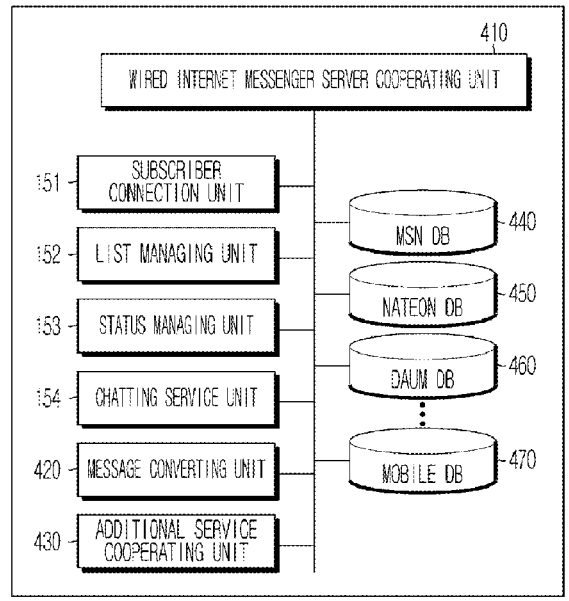
[Fig. 5]
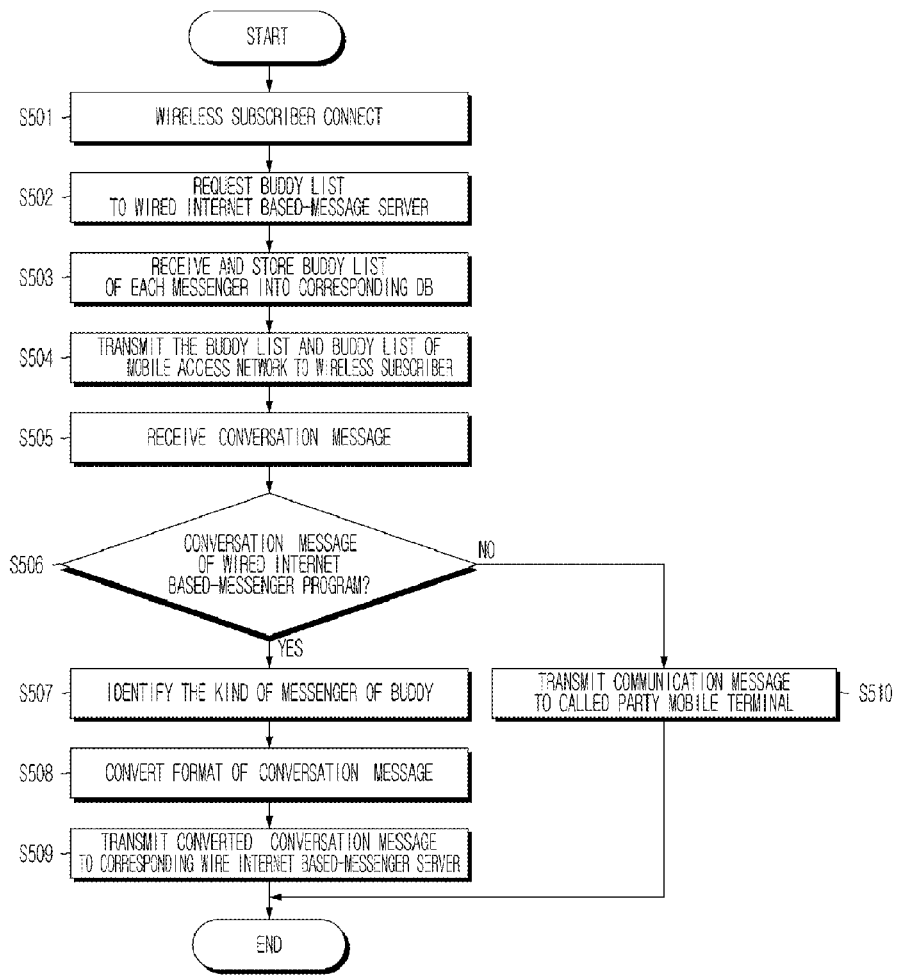

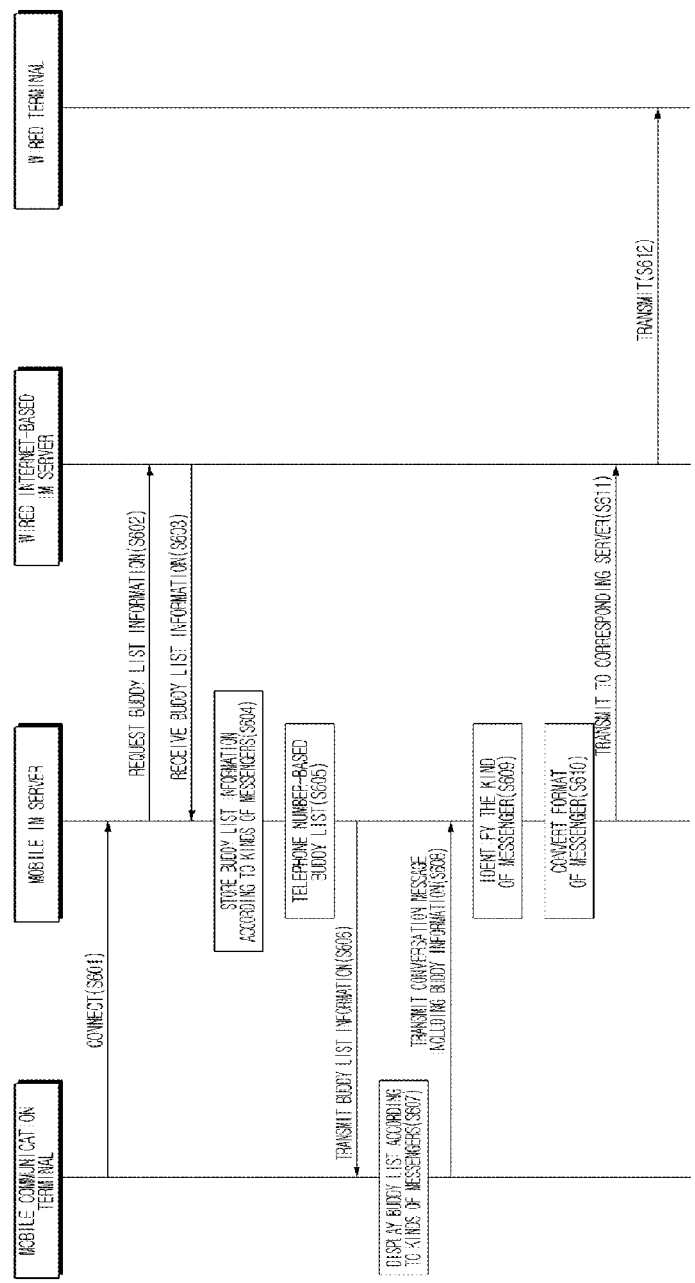
[Fig. 6]
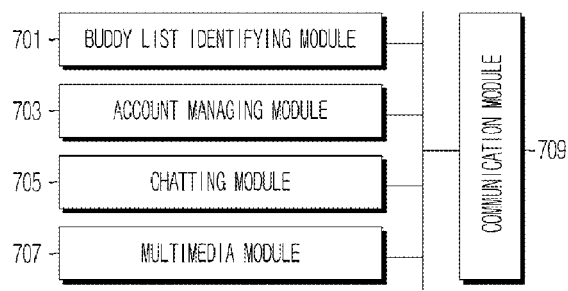
[Fig. 7]

APPARATUS AND METHOD FOR PROVIDING MOBILE INSTANT MESSAGING SERVICE

TECHNICAL FIELD

The present invention relates to an instant messaging service, and in particular, to a mobile instant messaging service.

BACKGROUND ART

An instant messaging service enables users who are online to instantly transmit and receive a message each other. The instant messaging service is provided based on e-mail accounts of the users on a wired Internet. The instant messaging service provides a one-to-one chatting feature, a file transmitting and receiving feature and other features.

With development of a mobile communication technique, recently a mobile instant messaging service is provided based on a mobile communication network. The mobile instant messaging service is derived from application of the wired Internet-based instant messaging service to a mobile communication system. A mobile communication subscriber installs an instant messaging client intended for a mobile terminal in his/her mobile terminal and uses an instant messaging service used in a wired Internet as it is.

A wire/wireless instant messaging service is not monopolized by a single service provider, but competitively provided by a plurality of service providers. For example, the wire/wireless instant messaging service includes MSN messenger by Microsoft, Daum messenger by Daum communications or NateOn messenger by SK communications.

The wire/wireless instant messaging services of the service providers are currently incompatible with each other, and attempts at creating a unified standardization have failed. As a result, in the case that an instant messaging service user uses a different messenger program from a contact with who he/she wants to chat, the instant messaging service user should download a messenger program of the contact that is provided by a different service provider from that of his/her existing messenger program.

In particular, a mobile communication terminal has lower data processing speed and memory capacity than a wired terminal, and thus an instant messaging service using the mobile communication terminal has difficulty in installing all of different instant messenger programs in the mobile communication terminal due to a limited performance of the mobile communication terminal.

Meanwhile, 3GPP (third generation partnership project) adopted a system structure, in which an IP multimedia (IMS: IP Multimedia Subsystem) domain for complexly providing multimedia including voice, audio, video or data based on IP protocol is introduced to a mobile communication backbone network. With introduction of a WCDMA (Wideband Code Division Multiple Access) system, the communication service providers have recognized the IMS domain as a core technology leading a market, and attempted to provide the mobile instant messaging service in the IMS domain.

DISCLOSURE OF INVENTION

Technical Problem

The present invention is designed to solve the problems of the prior art, and therefore it is an object of the present invention to provide apparatus and method for providing a mobile instant messaging service based on a telephone number in an IMS domain.

And, it is another object of the present invention to provide apparatus and method for providing a mobile instant messaging service, in which a plurality of instant messaging services are provided using a single instant messenger program in a mobile communication terminal.

Technical Solution

In order to achieve the above-mentioned objects, an apparatus for providing mobile instant messaging service, which provides a telephone number-based mobile instant messaging service in an IMS (IP Multimedia Subsystem) domain of a mobile communication network, includes a buddy status managing unit for recording and managing a status information of at least one mobile messenger subscriber; a buddy list managing unit cooperating with the buddy status managing unit for managing a buddy list of the mobile messenger subscriber based on a telephone number and providing the buddy list to the mobile messenger subscriber; and a chatting service unit for providing a chatting service between the mobile messenger subscriber and a buddy selected by the mobile messenger subscriber in the buddy list provided to the mobile messenger subscriber by the buddy list managing unit.

And, a method for providing mobile instant messaging service for integrating a plurality of instant message services into one and providing the integrated instant messaging service using a mobile instant messaging service apparatus of a mobile communication network, includes receiving a connection request from a mobile communication terminal; requesting a buddy list information registered by a user of the mobile communication terminal to a plurality of wired Internet-based instant messenger servers and receiving the buddy list information; and inserting an identifier for identifying a messenger kind of a corresponding buddy list into the received buddy list information and transmitting the buddy list information having the identifier to the mobile communication terminal.

Further, a mobile communication terminal for integrating a plurality of instant messaging services and providing the integrated instant messaging service, includes a memory having an integrated instant messenger client installed therein, and the integrated instant messenger client includes a buddy list identifying module for identifying and classifying a buddy list information transmitted from a mobile instant messaging service server of a mobile communication network according to messenger kind, and displaying the classified buddy list information; a buddy managing module for managing registration and deletion of a buddy and a status information of the buddy; and a chatting module for transmitting and receiving a conversation message by a single conversation window according to buddy selection of a user.

BRIEF DESCRIPTION OF THE DRAWINGS

FIG. 1 is a view illustrating a network configuration of a mobile instant messaging service system according to a preferred embodiment of the present invention.

FIG. 2 is a view illustrating a network configuration of a mobile instant messaging service system according to another embodiment of the present invention.

FIG. 3 is a view illustrating an embodiment of an interface display of an instant messenger program included in a mobile communication terminal.

FIG. 4 is a block diagram illustrating a configuration of a mobile instant messaging service server of the system of FIG. 2.

FIG. 5 is a flow chart illustrating a mobile instant messaging service method according to an embodiment of the present invention.

FIG. 6 is a flow chart illustrating a mobile instant messaging service method according to another embodiment of the present invention.

FIG. 7 is a functional block diagram illustrating an integrated instant messenger program included in a mobile communication terminal according to an embodiment of the present invention.

BEST MODE FOR CARRYING OUT THE INVENTION

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

FIG. 1 is a view illustrating a network configuration of a mobile instant messaging service system according to a preferred embodiment of the present invention.

As shown in FIG. 1, a mobile instant messaging service system according to the present invention includes mobile communication terminals 110 and 120, a wireless access network 130, an IP network 140 and a mobile instant messaging service server 150.

The mobile communication terminals 110 and 120 support voice and video communications, and include a client program therein for a mobile instant messaging service. The client program may be installed as a default in the manufacture of the mobile communication terminals 110 and 120, or may be downloaded from a mobile communication network and installed in the mobile communication terminals 110 and 120.

The wireless access network 130 includes a base station (NodeB) for executing wireless channel connection of the mobile communication terminals 110 and 120, a radio network controller (RNC) for controlling and managing the base station, and SGSN (Serving GPRS (General Packet Radio Service) Support Node) and GGSN (Gateway GPRS Support Node) connected to the radio network controller for executing packet data transmission.

The IP network 140 is an IMS (IP (Internet Protocol) Multimedia Subsystem) domain for complexly providing multimedia including voice, audio, video or data based on SIP (Session Initiation Protocol). The SIP (Session Initiation Protocol) is a protocol for setting interconnections between terminals having IP so that the terminals may exchange various multimedia data including video or audio each other. An SIP message has a large size, and thus requires compression. Preferably, the SIP message is compressed by a SigComp (Signal Compression: RFC3320) compression algorithm in the IP network 140. The SIP message is basically transmitted using upper layers of UDP (User Datagram Protocol), and if the size of SIP message exceeds 1300 Bytes, the SIP message is transmitted using TCP (Transmission Control Protocol).

According to SIP (Session Initiation Protocol), the IP network 140 includes CSCF (Call Session Control Function) for subscriber registration and multimedia call processing, and HSS (Home Subscriber Server) in which a home location register (HLR) function of an existing network is combined with a function for mobility management and authentication of an IP multimedia user. The IP network 140 has all functions of Harmonized IMS model, agreed by 3GPP (3rd Generation Partnership Project) and 3GPP2, i.e. standardization organization of a mobile network.

The mobile instant messaging service server 150 includes a subscriber connection unit 151 for executing connection of a mobile instant messaging service subscriber, a buddy status managing unit 152 for managing a status information of the mobile instant messaging service subscriber, a buddy list managing unit 153 for managing a buddy information of the mobile instant messaging service subscriber, a chatting service unit 154 for providing a chatting service to the mobile instant messaging service subscriber, a buddy status DB 155 managed by the buddy status managing unit 152, and a buddy list DB 156 managed by the buddy list managing unit 153.

The subscriber connection unit 151 is configured to perform an SIP (Session Initial Protocol) proxy function, and executes SIP digest authentication and SIP signaling compression functions.

The buddy status managing unit 152 manages the status information of the mobile instant messaging service subscriber, including an on/off status information and a detailed status information on-line (for example, out to lunch or in a meeting). The buddy status managing unit 152 records the status information of the subscriber into the buddy status DB 155 and updates the status information of the subscriber. The buddy status managing unit 152 maps the status information of the subscriber to a telephone number of the subscriber, and registers and manages the status information of the subscriber.

When the mobile instant messaging service subscriber turns on/off the mobile communication terminals 110 and 120, the buddy status managing unit 152 receives the on/off status information from the client program installed in the mobile communication terminals 110 and 120, and updates the status information of the corresponding subscriber stored in the buddy status DB 155.

And, the buddy status managing unit 152 changes the detailed status information of the corresponding subscriber in response to a detailed status information change request of the mobile communication terminals 110 and 120. For example, when the subscriber selects any one from "at another business", "away", "in class", "meeting" and "out to lunch" as the status information in the mobile communication terminals 110 and 120, the buddy status managing unit 152 updates the status information of the subscriber to the detailed status information selected by the subscriber. The status information of the subscriber managed by the buddy status managing unit 152 is stored into the buddy status DB 155.

The buddy list managing unit 153 stores the buddy list of the mobile instant messaging service subscriber into the buddy list DB 156, and manages the buddy list. The buddy list managing unit 153 classifies the buddy list of the subscriber into pre-determined groups according to selection of the subscriber and manages the classified buddy list. And, when the buddy list managing unit 153 receives a buddy registration request from the subscriber, the buddy list managing unit 153 records a buddy information to be registered into the buddy list of the subscriber. At this time, the buddy list managing unit 153 receives a telephone number as the buddy information from the subscriber.

When the mobile communication terminals 110 and 120 of the mobile instant messaging service subscriber are powered on and the client program is activated, the buddy list managing unit 153 extracts the buddy list of the subscriber from the buddy list DB 156, and transmits the extracted buddy list to the client program. At this time, the buddy list managing unit 153 cooperates with the buddy status managing unit 152 to obtain the status information of each buddy in the buddy list of the subscriber and transmits the status information to the client program.

The chatting service unit 154 provides text chatting, voice chatting and video chatting to the mobile instant messaging service subscriber. The chatting service unit 154 receives a conversation invitation message (INVITE) including a specific buddy information from the mobile communication terminals 110 and 120, and then transmits the conversation invitation message (INVITE) to a mobile communication terminal of the specific buddy and receives an acceptance message (OK) to the conversation invitation message. And, the chatting service unit 154 transmits the acceptance message (OK) to the mobile communication terminals 110 and 120. Next, the chatting service unit 154 generates a session with the mobile communication terminals 110 and 120 according to MSRP (Message Session Relay Protocol) to support the chatting. The chatting service unit 154 provides one-to-one chatting and one-to-many chatting.

Meanwhile, although not shown in FIG. 1, the mobile instant messaging service server 150 may further include a file transmitting and receiving unit. The file transmitting and receiving unit supports file transmitting and receiving of the mobile instant messaging service subscriber. The file transmitting and receiving unit receives a conversation invitation message and a file transmission message from the mobile communication terminals 110 and 120 of a subscriber as a sender, transmits the messages to a subscriber as a recipient, receives an acceptance message corresponding to the messages, and transmits the acceptance message to the mobile communication terminals 110 and 120 through which a file was transmitted. That is, when transmitting and receiving the file, the file transmitting and receiving unit proceeds with an instant messaging session and a file transmitting and receiving session at the same time. Therefore, the subscriber can read a file transmission proceeding status in a conversation window.

FIG. 2 is a view illustrating a network configuration of a mobile instant messaging service system according to another embodiment of the present invention. In FIG. 2, components having the same numeral reference as FIG. 1 have all functions of FIG. 1. The detailed description of the same components is omitted.

Referring to FIG. 2, the mobile instant messaging service server 150 is connected to a wired Internet-based instant messaging service server 210 through an Internet, and cooperates with the wired Internet-based instant messaging service server 210. At this time, the mobile instant messaging service server 150 may cooperate with the wired Internet-based instant messaging service server 210 through various networks other than the Internet, for example a wireless LAN, however hereinafter description is made based on the Internet. The mobile instant messaging service server 150 and the wired Internet-based instant messaging service server 210 operate instant messenger programs of different standards.

And, the mobile instant messaging service server 150 is directly connected to a wired terminal 250 through the Internet, so that a telephone number-based instant message service is provided between the mobile communication terminal 110 and the wired terminal 250. Here, the wired terminal 250 is a typical all-purpose personal computer, and may be a desk top computer or a notebook computer.

The mobile instant messaging service server 150 connects to a plurality of the wired Internet-based instant messaging service servers 210 through the Internet, and receives a buddy list information registered by a mobile user on the wired Internet and stores the buddy list information. That is, the mobile instant messaging service server 150 receives the buddy list information which the mobile user registered into each of the instant messenger programs on the wired Internet from the corresponding wired instant messaging service servers 210, and stores the buddy list information therein. Here, the buddy list information includes a contact, a user account (for example, Internet ID or e-mail account) of the contact and a current status (for example, offline, online, busy or away) information of the contact.

For example, when the mobile communication terminal 110 is connected, the mobile instant messaging service server 150 receives the buddy list information which the corresponding mobile user registered by wired Internet-based messenger from a wired Internet-based MSN messenger server 211, a wired Internet-based Daum messenger server 212 or a wired Internet-based NateOn messenger server 213 based on the user information (for example, telephone number) of the corresponding mobile communication terminal 110, classifies the buddy list information according to the service providers, stores the classified buddy list information into an inner database, and transmits the classified and stored buddy list information to the mobile communication terminal 110.

And, the mobile instant messaging service server 150 transmits the buddy list information, which is received from a plurality of the wired Internet-based instant messaging service servers 210 and stored in the inner database, to the mobile communication terminal 110, and in the case that the status of the buddy list is changed, the mobile instant messaging service server 150 updates the buddy list information of the mobile communication terminal 110. The mobile communication terminal 110 receives the buddy list information of different standards from the mobile instant messaging service server 150, and then classifies and displays the buddy list information according to the service providers.

And, the mobile instant messaging service server 150 converts an instant message transmitted from a wired terminal 215 according to the IP network 140 protocol, and transmits the converted instant message to the mobile communication terminal 110. Further, the mobile instant messaging service server 150 converts the instant message transmitted from the mobile communication terminal 110 in conformity with a data format of the instant message program installed in the called party wired terminal 215, and transmits the converted instant message to the wired Internet-based instant messaging service server 210.

For example, when a user using the wired terminal 215 communicates with a user using the mobile communication terminal 110 by MSN messenger, the wired Internet-based MSN messenger server 211 receives a conversation message from the MSN messenger program of the wired terminal 215, and transmits the received conversation message to the mobile instant messaging service server 150. The mobile instant messaging service server 150 converts the received conversation message in conformity with the IP network 140 protocol and transmits the converted conversation message to the mobile communication terminal 110. Further, mobile instant messaging service server 150 receives a conversation message from the mobile communication terminal 110, and then converts the received conversation message in conformity with a data format of the MSN messenger program and transmits the converted conversation message to the wired Internet-based MSN messenger server 211. The wired Internet-based MSN messenger server 211 receives the conversation message, and then transmits the corresponding conversation message to the MSN messenger program installed in the wired terminal 215.

And, the mobile instant messaging service server 150 provides a telephone number-based instant message service between the mobile communication terminal 110 and another communication terminal and a telephone number-based instant messaging service between the mobile communication terminal 110 and the wired terminal 250. For this purpose, a messenger program for the telephone number-based instant message service is installed in the wired terminal 250.

And, the mobile instant messaging service server 150 provides a mobile telephone number-based additional service and an Internet user account (for example, Internet ID or E-mail account)-based additional service in cooperation with the instant message service. A mobile coupon, a gift ticket, mobile payment, a bell sound or a personalized ring-back tone service is a mobile communication service in which money is charged and paid and the balance is managed based on a mobile telephone number, and the mobile instant messaging service server 150 makes the mobile telephone number-based additional service shared in the messenger program installed in the mobile communication terminal 110 and the wired Internet-based messenger program. For this purpose, the messenger installed in the mobile communication terminal 110 and the messenger installed in the wired terminal 215 each provides a tab for this feature.

For example, in the case that a user who operated the instant messenger program in the mobile communication terminal 110 gives a mobile coupon to a wired Internet-based instant message service user having a user account including an Internet ID or an E-mail account, the mobile instant messaging service server 150 receives the mobile coupon serial number and the user account (Internet ID or E-mail account) of the wired Internet-based instant message service user from the mobile communication terminal 110. Then, the mobile instant messaging service server 150 transmits the user account to the wired Internet-based instant messenger servers 211, 212 and 213, with which the wired Internet-based instant message service user is in connection, receives a mobile telephone number corresponding to the user account, maps the mobile coupon serial number to the received mobile telephone number, and transmits the mobile telephone number to an additional service server 270. This method may be applied to a bell sound or a personalized ring-back tone service in the same manner as the mobile coupon.

On the other hand, in the case that the wired Internet messenger user having the user account including an Internet ID or an E-mail account gives a mobile coupon to the user of the mobile communication terminal 110, the mobile instant messaging service server 150 receives the mobile coupon serial number from the wired Internet-based instant messenger servers 211, 212 and 213, maps the mobile coupon serial number to a telephone number of the user of the mobile communication terminal 110, and transmits the telephone number to the additional service server 270.

And, a product purchase in a wired Internet shopping mall is the Internet account (Internet ID or E-mail account)-based service, and the messenger installed in the wired terminal 215 provides the tab for the Internet account-based service. After a user clicks a shopping mall tab in the Internet account (for example, Internet ID or E-mail account)-based messenger (for example, MSN messenger) installed in the wired terminal 215 and purchases a product, the user may give the product to a user using the instant messenger program of the mobile communication terminal 110. When the user clicks the shopping mall tab in the Internet account-based messenger installed in the wired terminal 215, a web server 230 of the shopping mall provides a product purchase web page. And, when the user purchases a product and selects a contact and a 'gift' menu, the web server 230 transmits a corresponding product information and an Internet account (for example, Internet ID or E-mail account) of the contact to the mobile instant messaging service server 150. The mobile instant messaging service server 150 receives the Internet account from the web server 230, converts the received Internet account to a telephone number of the corresponding user, maps the product information to the telephone number of the user, and stores the telephone number.

FIG. 3 is a view illustrating an embodiment of an interface display of the instant messenger program installed in the mobile communication terminal 110, and when a corresponding menu is selected, the mobile instant messenger program installed in the mobile communication terminal 110 displays the buddy list information of different standards that are transmitted from the mobile instant messaging service server 150.

As shown in (a) of FIG. 3, when the user selects a menu of 'NateOn' 301, a 'NateOn' buddy list information is displayed. When the user selects the menu of 'NateOn' 301, the mobile communication terminal 110 receives the 'NateOn' buddy list information from the mobile instant messaging service server 150 and displays the 'NateOn' buddy list information. And, although not shown in FIG. 3, when the user selects a menu of 'MSN', the mobile communication terminal 110 receives an 'MSN' buddy list information from the mobile instant messaging service server 150 and displays the 'MSN' buddy list information. And, when a menu of buddybuddy or yahoo is selected, the mobile communication terminal 110 receives and displays a buddy list information of a corresponding service provider.

Meanwhile, as shown in (b) of FIG. 3, when the user selects a buddy, a chatting window is activated regardless of kinds of messenger so that a real-time chatting is made with the buddy. And, as shown in (c) of FIG. 3, when the user receives a conversation message from another terminal and is asked whether to accept or reject the conversation, and then accepts the conversation, a real-time chatting is made with a user of another terminal as shown in (b) of FIG. 3.

Further, the mobile instant messaging service server 150 provides a wireless Internet-based messenger service based on a telephone number as well as the wired Internet-based messenger service. That is, the mobile instant messaging service server 150 registers, revises and deletes a buddy list based on telephone numbers used to distinguish subscribers in the mobile communication network, and supports one-to-one chatting, one-to-many chatting and file transmitting and receiving with a buddy of the registered buddy list. For this purpose, the mobile instant messaging service server 150 has another database for storing a buddy list generated based on a subscriber identification number of the mobile communication network, separately from the database cooperating with the wired Internet-based instant messaging service. In (a) of FIG. 3, 'MIM' is a menu of the instant messaging service provided based on the telephone number in the mobile communication network, and when the user selects 'MIM', a buddy list information registered based on the telephone number is displayed.

And, although not shown in FIG. 3, the mobile instant messaging service server 150 provides a mobile telephone number-based additional service and an Internet user account (for example, Internet ID or E-mail account)-based additional service in co-operation with the instant messaging service. A mobile coupon, a gift ticket, mobile payment, a bell sound or a personalized ring-back tone service is a mobile communication service in which money is charged and paid and the balance is managed based on the mobile telephone number, and the mobile instant messaging service server 150 makes the mobile telephone number based-additional service shared in the integrated messenger installed in the mobile communication terminal 110 and the messenger installed in the wired terminal 215. For this purpose, the messenger installed in the mobile communication terminal 110 and the messenger installed in the wired terminal 215 each provides a tab for this function.

FIG. 4 is a block diagram illustrating a configuration of the mobile instant messaging service server of FIG. 2. In FIG. 2, components having the same numeral reference as FIG. 1 have all functions of FIG. 1. The detailed description of the same components is omitted.

A wired Internet-based messenger server cooperating unit 410 is connected to a plurality of the wired Internet-based instant messaging service servers 210, for example MSN messenger server 211, Daum messenger server 212 or NateOn messenger server 213, so that the buddy list information is received from each of the wired Internet-based instant messaging service servers 210. The buddy list information includes a screen name of a buddy, a user account of the buddy and a current status (for example, offline, online, busy or away) information of the buddy. The buddy list information received from the wired Internet-based messenger server cooperating unit 410 is stored into databases 440, 450 and 460 according to service providers.

When a subscriber is connected through the mobile communication terminal 110, the buddy list managing unit 152 requests the buddy list information according to service providers which is registered and used by the subscriber, to the corresponding wired Internet-based instant messaging service server 210. And, the buddy list managing unit 152 transmits the buddy list information according to service providers to the mobile communication terminal 110. At this time, the buddy list information according to service providers includes an identifier for identifying the kind of buddy list. Meanwhile, the buddy list managing unit 152 executes buddy registration/revision and group generation/deletion at the request of the subscriber, and performs an approval step to a buddy which the subscriber requested to register.

That is, the buddy list managing unit 152 updates the corresponding buddy and group information stored in the database at the subscriber's request of buddy registration/revision and group generation/deletion, and in the case that the corresponding request is about a wired Internet-based buddy, the buddy list managing unit 152 transmits the corresponding buddy information to the wired Internet-based messenger server cooperating unit 410 so that each of the wired Internet-based instant messaging service servers 210 updates the corresponding buddy information. For example, when a subscriber of the mobile communication terminal 110 registers a buddy into the MSN buddy list, the buddy list managing unit 152 transmits a corresponding buddy information to the wired Internet-based MSN messenger server 211 so that the wired Internet-based MSN messenger server 211 performs an approval step to the corresponding buddy. When the corresponding buddy approves, the buddy list managing unit 152 receives an approval result from the wired Internet-based MSN messenger server 211 and updates the result to the MSN DB 440.

The buddy status managing unit 153 manages a subscriber information (for example, telephone number, screen name or IP address) and the status information (Presence) of the subscriber, and executes an operation corresponding to the subscriber's request of status information change that is made through the mobile communication terminal 110. The buddy status managing unit 153 extracts the buddy list information according to the kinds of messenger, includes a separate identifier into the buddy list information, and transmits the buddy list information including the identifier to the mobile communication terminal 110. The mobile communication terminal 110 checks a type of messenger program that the corresponding buddy list information belongs to, and display the buddy list information.

The chatting service unit 154 provides a conversation service between the mobile communication terminal 110 and the wired terminal 215 and a conversation service between the mobile communication terminal 110 and another mobile communication terminal. That is, when the user of the mobile communication terminal 110 selects a buddy, the chatting service unit 154 receives a conversation message including the buddy information from the mobile communication terminal 110. The chatting service unit 154 identifies the kind of messenger of the corresponding buddy based on the buddy information, and transmits the conversation message including the buddy information to the wired Internet-based instant messaging service server 210 corresponding to the identified kind of messenger.

At this time, the chatting service unit 154 converts format of the conversation message transmitted between the mobile communication terminal 110 and the wired terminal 215 through a message converting unit 420. For example, in the case that the mobile communication terminal 110 and the wired terminal 215 use MSN messenger, the message converting unit 420 converts the conversation message transmitted from the mobile communication terminal 110 in conformity with a data format of the wired Internet-based MSN messenger program, and when receiving the conversation message from the wired Internet-based MSN messenger server 211, the message converting unit 420 data converts the conversation message in conformity with a system specification of the mobile communication terminal 110 and transmits the converted conversation message to the mobile communication terminal 110. Here, the conversation message includes a text type conversation message, a video telephone conversation message or a voice telephone conversation message.

Meanwhile, the MSN DB 440 receives the buddy list information which the user registered in the wired Internet-based MSN messenger program, from the wired Internet-based messenger server cooperating unit 410 and stores the buddy list information therein, and the NateOn DB 450 stores the buddy list information therein which the user registered in the wired Internet-based NateOn messenger program. And, the Daum DB 460 stores the buddy list information therein, which the user registered in the wired Internet-based Daum messenger program. And, a mobile DB 470 stores the buddy list information therein, which the user registered in the mobile communication network based on the telephone number. The mobile messenger database 470 is an equivalent including the buddy status DB 155 and the buddy list DB 156. Here, the buddy list information includes a buddy, a user account of the buddy and a current status (for example, offline, online, busy or away) information of the buddy.

An additional service cooperating unit 430 makes a mobile communication-based additional service and an Internet user account (for example, Internet ID or E-mail account)-based additional service shared in the integrated messenger installed in the mobile communication terminal 110 and the wired Internet-based messenger. A mobile coupon, a gift ticket, mobile payment, a bell sound or a personalized ringback tone service is a mobile communication service in which money is charged and paid and the balance is managed based on the mobile telephone number, and the additional service cooperating unit 430 makes a mobile telephone number-based additional service shared in the integrated messenger installed in the mobile communication terminal 110 and the wired Internet-based messenger.

For example, in the case that a user who operated the integrated instant messenger program in the mobile communication terminal 110 gives a mobile coupon to a wired Internet-based instant message service user having a user account including an Internet ID or an E-mail account (for example, to an arbitrary buddy in the buddy list displayed when selecting the menu of 'MSN' as shown in FIG. 3), the additional service co-operating unit 430 receives the mobile coupon serial number and the user account of the wired Internet-based instant message service user (i.e. Internet ID or E-mail account of the arbitrary buddy). And, the additional service cooperating unit 430 transmits the user account (i.e. Internet ID or E-mail account of the arbitrary buddy) to the wired Internet-based instant messenger server (i.e. MSN messenger server) being connected by the wired Internet-based instant message service user (i.e. the arbitrary buddy), receives a mobile telephone number corresponding to the user account from the mobile communication terminal 110, maps the mobile coupon serial number to the received mobile telephone number, and transmits the telephone number to the additional service server. This method is applied to a bell sound or a personalized ring-back tone service in the same manner as the mobile coupon.

Hereinafter, function and operation of each of the components of FIG. 4 are described in detail with reference to FIG. 5.

First, when the mobile communication terminal 110 is connected to the subscriber connection unit 151 (S501), the buddy list managing unit 152 requests a buddy list information which a subscriber registered through the wired Internet-based instant messenger program, to a plurality of the wired Internet-based instant messaging service servers 210 through the Internet based on the subscriber information (for example, telephone number, screen name or IP address) of the mobile communication information terminal 110 (S502). That is, the buddy list managing unit 152 requests the buddy list information registered by the subscriber of the mobile communication terminal 110 to the wired Internet-based MSN messenger server 211, wired Internet-based Daum messenger server 212 or wired Internet-based NateOn messenger server 213.

Next, the buddy list managing unit 152 receives the buddy list information according to the kinds of messenger from each of the wired Internet-based instant messaging service servers 210 and stores the buddy list information into the corresponding database (S503), extracts the buddy list information and a buddy list information which the subscriber registered based on the telephone number through the mobile communication network, from the database, and transmits the extracted buddy list information to the mobile communication terminal 110 (S504). The buddy list information according to the kinds of messenger includes an identifier for identifying the kind of buddy list. The buddy status managing unit 153 manages the status of a buddy included in the buddy list transmitted to the mobile communication terminal 110 and the status of the subscriber of the mobile communication terminal 110, and updates the status of the buddy list of the mobile communication terminal 110 and the wired terminal 215 in real time.

Subsequently, when the user selects a buddy in the mobile communication terminal 110 and then inputs a conversation message, the chatting service unit 154 receives the conversation message including the buddy information from the mobile communication terminal 110 (S505). And, the chatting service unit 154 checks based on the buddy information whether the corresponding buddy is a buddy of the wired Internet-based instant messenger service (S506), and in the case that the corresponding buddy is a buddy of the wired Internet-based instant messenger service, checks a type of service provider (i.e. messenger) that the corresponding buddy belongs to (S507). And, the chatting service unit 154 converts a data format of the received conversation message in conformity with a data format of the instant messenger program of the corresponding service provider through the message converting unit 420 (S508).

And, the chatting service unit 154 transmits the conversation message having the converted data format to the wired Internet-based instant messaging service server 210 of the corresponding service provider (S509). The wired Internet-based instant messaging service server 210 receives the conversation message, and then transmits the corresponding message to the called party wired terminal 215.

Meanwhile, according to a check result in the step S506, in the case that the corresponding buddy is a buddy of the telephone number-based mobile communication network, the chatting service unit 154 transmits the received conversation message to the called party mobile communication terminal 110 without change of its data format (S510).

FIG. 6 is a flow chart illustrating a mobile instant messaging service method according to another embodiment of the present invention.

As shown in FIG. 6, first, the mobile communication terminal 110 is connected to the mobile instant messaging service server 150 (S601).

Subsequently, the mobile instant messaging service server 150 requests a buddy list information to a plurality of the wired Internet-based instant messaging service servers 210 based on the subscriber information (for example, telephone number) of the connected mobile communication terminal 110 (S602). That is, the mobile instant messaging service server 150 requests the buddy list information which the user of the mobile communication terminal 110 registered through the wired Internet-based instant messenger program on the wired Internet, to a plurality of the wired Internet-based instant messaging service servers according to service providers, for example the wired Internet-based MSN messenger server 211, wired Internet-based Daum messenger server 212 or wired Internet-based NateOn messenger server 213. At this time, the mobile instant messaging service server 150 is connected to and cooperates with a plurality of the wired Internet-based instant messaging service servers 210 through the Internet.

Next, the mobile instant messaging service server 150 receives the buddy list information which the user of the mobile communication terminal 110 registered on the wired Internet, from the instant messaging service servers 210 according to the service providers (S603). And, the mobile instant messaging service server 150 stores the received buddy list information according to the service providers into the corresponding database (604).

Subsequently, the mobile instant messaging service server 150 extracts the buddy list information which the user of the mobile communication terminal 110 registered based on the telephone number in the mobile communication network, from the corresponding database (S605). That is, the mobile instant messaging service server 150 extracts the buddy list information of the messenger service which is provided based on the telephone number in the mobile communication network, from the database.

And, the mobile instant messaging service server 150 transmits the extracted wireless Internet-based buddy list information and the wired Internet-based buddy list information received in the step S603 to the mobile communication terminal 110 (S606). At this time, each of the buddy list information includes an identifier so that the mobile communication terminal 110 identifies the kind of messenger to display the buddy list according to the kind of messenger.

The mobile communication terminal 110 receives the buddy list information, and then identifies the kind of messenger of the buddy list based on the identifier included in the buddy list information, classifies the buddy list information according to the kind of messenger and displays classified buddy list information on a display unit (S607).

Meanwhile, when the user selects any one buddy from the buddy list displayed after selecting the kind of messenger in the mobile communication terminal 100 and inputs a conversation message, the mobile communication terminal 100 transmits the conversation message including the buddy information to the mobile instant messaging service server 150 (S608). At this time, the buddy information includes the identifier for identifying which kind of messenger the corresponding buddy belongs to.

The mobile instant messaging service server 150 receives the conversation message including the buddy information, and then identifies based on the identifier included in the buddy information which kind of messenger the corresponding conversation message belong to (S609). And, the mobile instant messaging service server 150 converts a data format of the conversation message in conformity with a data format of the identified kind of messenger program (S610), and then transmits the converted conversation message to the corresponding wired Internet-based instant messaging service server 210. (S611). The wired Internet-based instant messaging service server 210 receives the corresponding conversation message and transmits the conversation message to the instant messenger program of the wired terminal 215 (S612).

Although in this embodiment, the user selects a buddy of the wired Internet-based instant messenger service in the mobile communication terminal 110, if the user selects a buddy of the wireless Internet-based instant messenger service based on the telephone number, the mobile instant messaging service server 150 directly transmits the conversation message to the called party mobile communication terminal 110 without conversion of a data format of the conversation message. And, although it is described with reference to FIG. 6 that the conversation message is transmitted from the mobile communication terminal 110 to the wired terminal 215, the conversation message may be transmitted from the wired terminal 215 to the mobile communication terminal 110. In this case, the mobile instant messaging service server 150 converts the conversation message received from the wired terminal 215 in conformity with a system specification of the mobile communication terminal 110 and the converted conversation message to the mobile communication terminal 110.

FIG. 7 is a functional block diagram illustrating the integrated instant messenger program included in the mobile communication terminal according to an embodiment of the present invention.

As shown in FIG. 7, the instant messenger program installed in the mobile communication terminal according to the present invention includes a buddy list identifying module 701, an account managing module 703, a chatting module 705, a multimedia module 707, an additional service module 711 and a communication module 709.

The buddy list identifying module 701 identifies the kind of messenger of the buddy list transmitted from the mobile instant messaging service server 150, classifies the buddy list according to the kind of messenger and displays the classified buddy list. That is, the buddy list identifying module 701 checks through the identifier included in the buddy list information transmitted from the mobile instant messaging service server 150 which service provider the corresponding buddy list belongs to, and then classifies the buddy list information, and displays the classified buddy list information.

The account managing module 703 manages a new buddy, i.e. registration/deletion of a buddy and a status information of the buddy list. And, the chatting module 705 supports one-to-one chatting and one-to-many chatting with the buddy. And, as shown in FIG. 3 (*b*), the chatting module 705 enables a user to chat with a buddy of a different messenger from his/her messenger by a single conversation window regardless of the kind of messenger of the buddy.

The multimedia module 707 is configured to transmit and receive a multimedia data such as a still image or a moving image, and display the multimedia data.

Meanwhile, the communication module 709 serves communication with the mobile instant messaging service server 150. A basic communication is made in a text type XML, and preferably a communication protocol is a text-based XMPP (extensible Messaging and Presence Protocol). Alternatively, a communication protocol may be a text-based messenger protocol operated under SIMPLE-XMPP IWF. Here, SIMPLE means Session Initiation Protocol (SIP) Extension for Instant Messaging and Presence functionality, and IWF means Inter-Working Function.

And, the communication module 709 manages an extension protocol for multimedia transmission. And, it is required that Instant Messaging/Presence protocol is based on RFC 2779, and the Presence and Instant Messaging model is based on RFC 2778.

As described above, the method of the present invention may be stored in a recording medium (CD-ROM, RAM, ROM, floppy disc, hard disc or optical disc). A storing method is apparent to an ordinary person in the art, and its detailed description is herein omitted.

As such, it should be understood that the detailed description and specific examples, while indicating preferred embodiments of the invention, are given by way of illustration only, since various changes and modifications within the spirit and scope of the invention will become apparent to those skilled in the art from this detailed description.

INDUSTRIAL APPLICABILITY

As described above, the present invention integrates a plurality of instant messaging services and provides the integrated instant messaging service in a mobile communication system, thereby eliminating the inconvenience of individually installing a program for each of the instant messaging services, and in particular, bringing to activity of the instant messaging service in the mobile communication service.

And, the present invention may use a plurality of the instant messaging services by a single client program, thereby effectively utilizing a memory capacity of the mobile communication terminal.

The invention claimed is:

1. An apparatus for providing mobile instant messaging service, which provides a telephone number-based mobile instant messaging service in an IMS (IP Multimedia Subsystem) domain of a mobile communication network, the apparatus comprising:
 a buddy status managing unit for recording and managing a status information of at least one mobile messenger subscriber;
 a buddy list managing unit cooperating with the buddy status managing unit for managing a buddy list of the mobile messenger subscriber based on a telephone number and providing the buddy list to the mobile messenger subscriber;
 a chatting service unit for providing a chatting service between the mobile messenger subscriber and a buddy selected by the mobile messenger subscriber in the buddy list provided to the mobile messenger subscriber by the buddy list managing unit;
 a file transmitting and receiving unit for transmitting and receiving a file between the mobile messenger subscriber and the buddy selected by the mobile messenger subscriber in the buddy list provided to the mobile messenger subscriber by the buddy list managing unit; and
 a cooperating unit for cooperating with a plurality of wired Internet-based instant messenger servers,
 wherein the buddy list managing unit receives and stores each buddy list information registered by the mobile messenger subscriber from a plurality of the wired Internet-based instant messenger servers, inserts an identifier for identifying a messenger kind of the corresponding buddy list into each buddy list information, and provides the buddy list information having the identifier to the mobile messenger subscriber.

2. The apparatus for providing mobile instant messaging service according to claim 1, further comprising:
 a message converting unit for converting a protocol of a message transmitted and received between the mobile messenger subscriber and a wired messenger subscriber by the chatting service unit.

3. A mobile communication terminal for integrating a plurality of instant messaging services and providing the integrated instant messaging service, the mobile communication terminal comprising:
 a memory having an integrated instant messenger client installed therein,
 the integrated instant messenger client including:
  a buddy list identifying module for identifying and classifying a buddy list information transmitted from a mobile instant messaging service server cooperating with a plurality of wired Internet-based instant messenger servers according to an identifier for identifying a messenger kind including the buddy list information, and displaying the classified buddy list information;
  a buddy managing module for managing registration and deletion of a buddy and a status information of the buddy; and
  a chatting module for transmitting and receiving a conversation message by a single conversation window according to buddy selection of a user.

4. The mobile communication terminal according to claim 3,
 wherein the buddy managing module registers the buddy based on a telephone number inputted from the user.

5. The mobile communication terminal according to claim 4,
 wherein the buddy list identifying module displays the buddy registered based on the telephone number as a separate menu.

* * * * *